US011628737B2

(12) United States Patent
McNair et al.

(10) Patent No.: US 11,628,737 B2
(45) Date of Patent: Apr. 18, 2023

(54) IN-FLIGHT RECHARGING OF AERIAL ELECTRIC VEHICLES

(71) Applicant: Bell Textron Inc., Fort Worth, TX (US)

(72) Inventors: Michael Kevin McNair, Weatherford, TX (US); Mark David Stoufflet, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 249 days.

(21) Appl. No.: 16/780,670

(22) Filed: Feb. 3, 2020

(65) Prior Publication Data

US 2021/0237606 A1 Aug. 5, 2021

(51) Int. Cl.
*H02J 7/00* (2006.01)
*H02J 7/14* (2006.01)
*B60L 53/62* (2019.01)
*B64C 39/02* (2023.01)
*B64D 41/00* (2006.01)
*B60L 53/36* (2019.01)
*B60L 53/66* (2019.01)
*B60L 53/50* (2019.01)
*B60L 58/12* (2019.01)
*B60L 53/14* (2019.01)
*H01R 13/642* (2006.01)
*H01R 13/62* (2006.01)
*B60L 53/12* (2019.01)

(52) U.S. Cl.
CPC .............. *B60L 53/62* (2019.02); *B60L 53/12* (2019.02); *B60L 53/14* (2019.02); *B60L 53/36* (2019.02); *B60L 53/50* (2019.02); *B60L 53/665* (2019.02); *B60L 58/12* (2019.02); *B64C 39/024* (2013.01); *B64D 41/00* (2013.01); *H01R 13/6205* (2013.01); *H01R 13/642* (2013.01); *B60L 2200/10* (2013.01)

(58) Field of Classification Search
CPC .......... B60L 53/62; B60L 53/12; B60L 53/50; B60L 53/14; B60L 53/36; B60L 53/665; B60L 58/12
USPC .................................................. 320/104, 109
See application file for complete search history.

(56) References Cited

U.S. PATENT DOCUMENTS

| | | | | |
|---|---|---|---|---|
| 5,499,784 A | * | 3/1996 | Crabere | B64D 39/00 244/135 A |
| 10,479,528 B1 | * | 11/2019 | Liang | G06Q 20/145 |
| 11,133,684 B1 | * | 9/2021 | Maurer | G05D 1/12 |
| 2007/0069071 A1 | * | 3/2007 | Near | B64D 39/00 244/99.2 |
| 2009/0020346 A1 | * | 1/2009 | Krauer | H01M 10/625 429/61 |
| 2013/0168497 A1 | * | 7/2013 | Rix | B64D 39/06 244/135 A |
| 2013/0168498 A1 | * | 7/2013 | Rix | G05D 1/101 244/135 A |

(Continued)

*Primary Examiner* — Alexis B Pacheco
(74) *Attorney, Agent, or Firm* — Akona IP

(57) ABSTRACT

One embodiment includes an electrical tanker aircraft for in-flight recharging a worker aircraft, comprising: a charge source; an umbilical to engage an in-flight charge recipient aircraft; and control logic to determine that the umbilical has engaged the charge recipient aircraft, and to transfer charge until a termination condition is met.

19 Claims, 11 Drawing Sheets

(56) References Cited

U.S. PATENT DOCUMENTS

| | | | | |
|---|---|---|---|---|
| 2014/0179164 A1* | 6/2014 | Kanamori | ............... | B60L 53/67 |
| | | | | 439/620.21 |
| 2014/0339371 A1* | 11/2014 | Yates | ..................... | B64D 27/24 |
| | | | | 244/53 R |
| 2015/0336677 A1* | 11/2015 | Smaoui | .................. | B64C 39/02 |
| | | | | 320/109 |
| 2016/0031564 A1* | 2/2016 | Yates | ..................... | B64D 33/00 |
| | | | | 307/9.1 |
| 2017/0050749 A1* | 2/2017 | Pilskalns | ................ | B64F 1/362 |
| 2017/0136904 A1* | 5/2017 | Ricci | ....................... | B60L 53/32 |
| 2018/0229859 A1* | 8/2018 | Evans | ..................... | H02J 50/80 |
| 2018/0276993 A1* | 9/2018 | Chow | .................. | G08G 5/0013 |
| 2019/0023133 A1* | 1/2019 | Renold | ................... | B64F 1/007 |
| 2019/0197463 A1* | 6/2019 | Blake | ...................... | B60L 53/62 |
| 2019/0237999 A1* | 8/2019 | Tillotson | ................. | H02J 50/90 |
| 2019/0263538 A1* | 8/2019 | O'Brien | ................. | H02J 7/0013 |
| 2019/0315479 A1* | 10/2019 | Tillotson | ............... | G01S 5/0072 |
| 2019/0359345 A1* | 11/2019 | Rix | ...................... | G05D 1/0094 |
| 2019/0381910 A1* | 12/2019 | Akhavan-Tafti | ........ | H02J 7/025 |
| 2020/0262305 A1* | 8/2020 | Chakraborty | ...... | G01C 21/3438 |

* cited by examiner

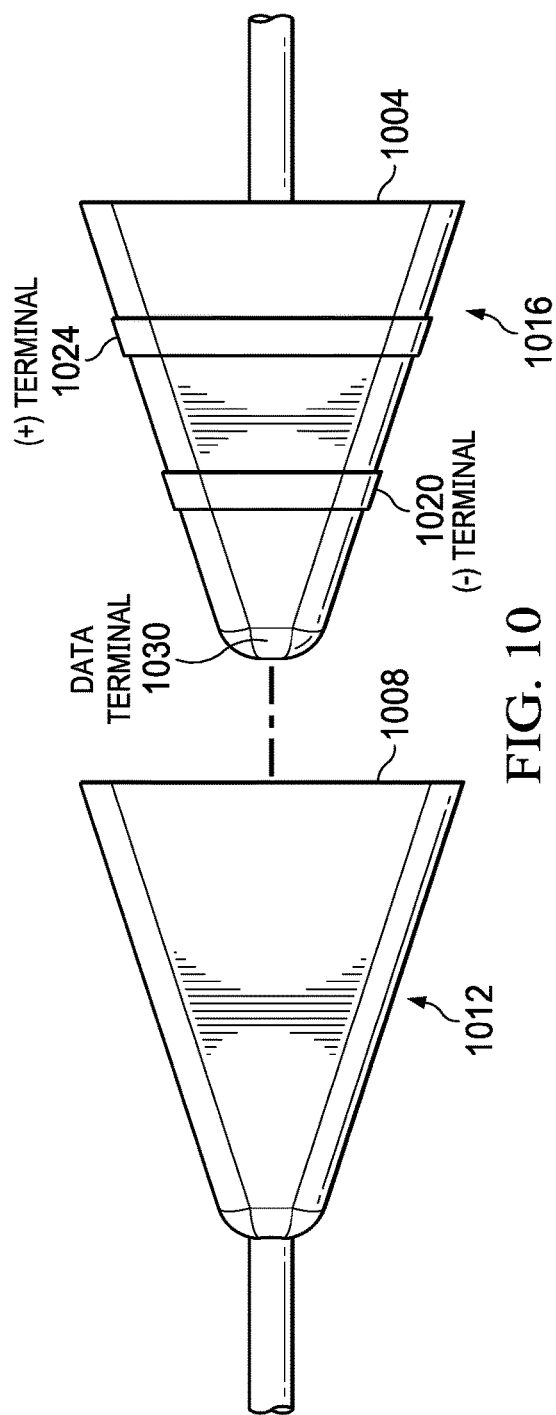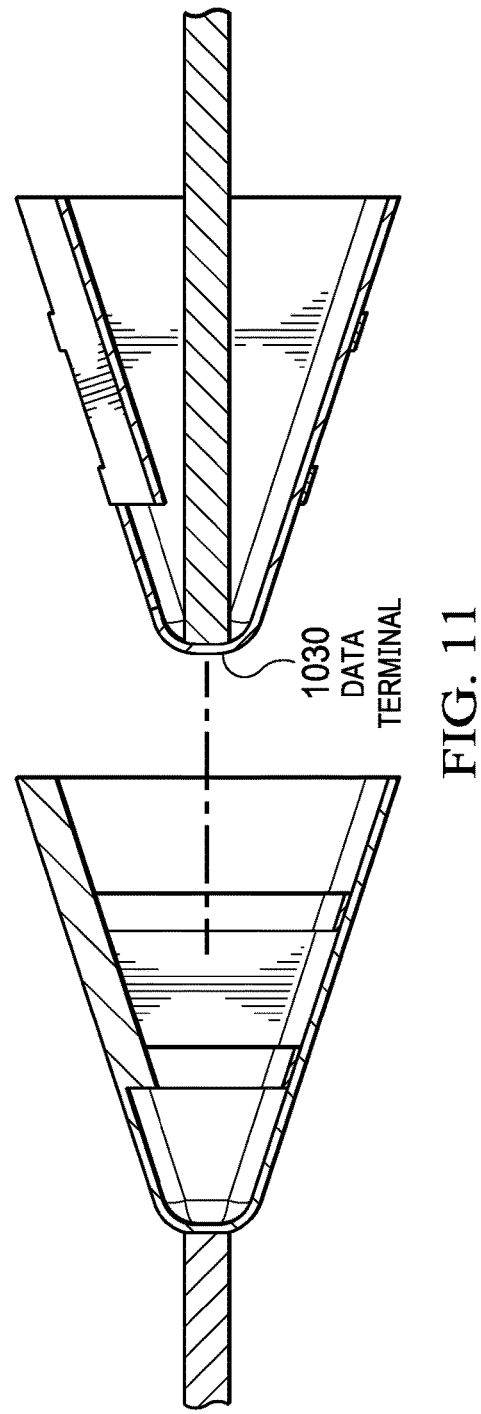

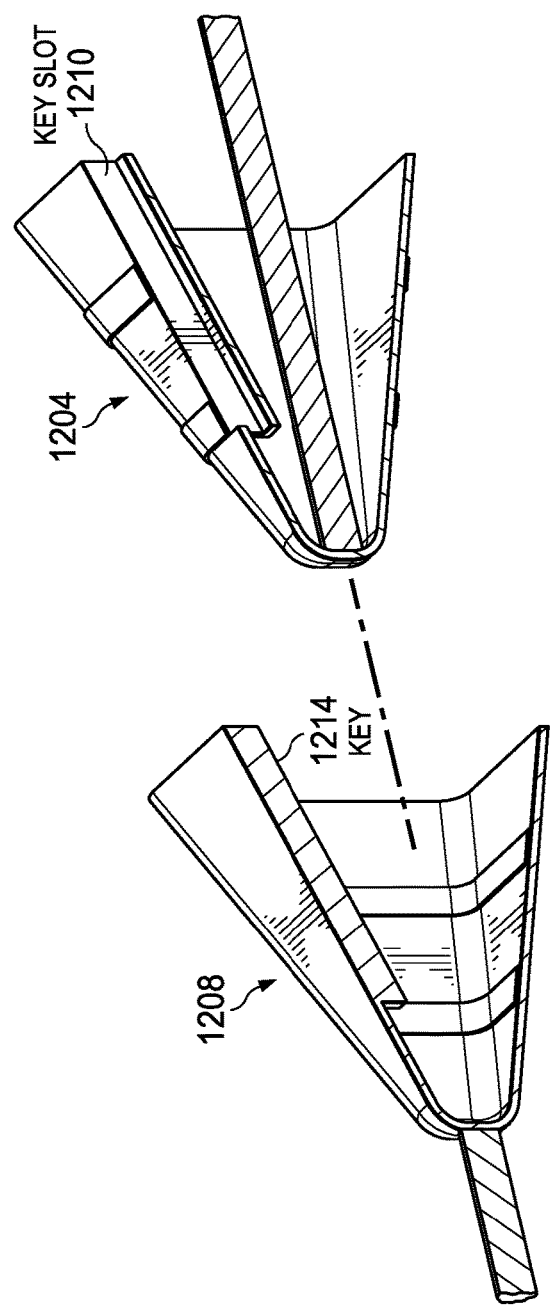
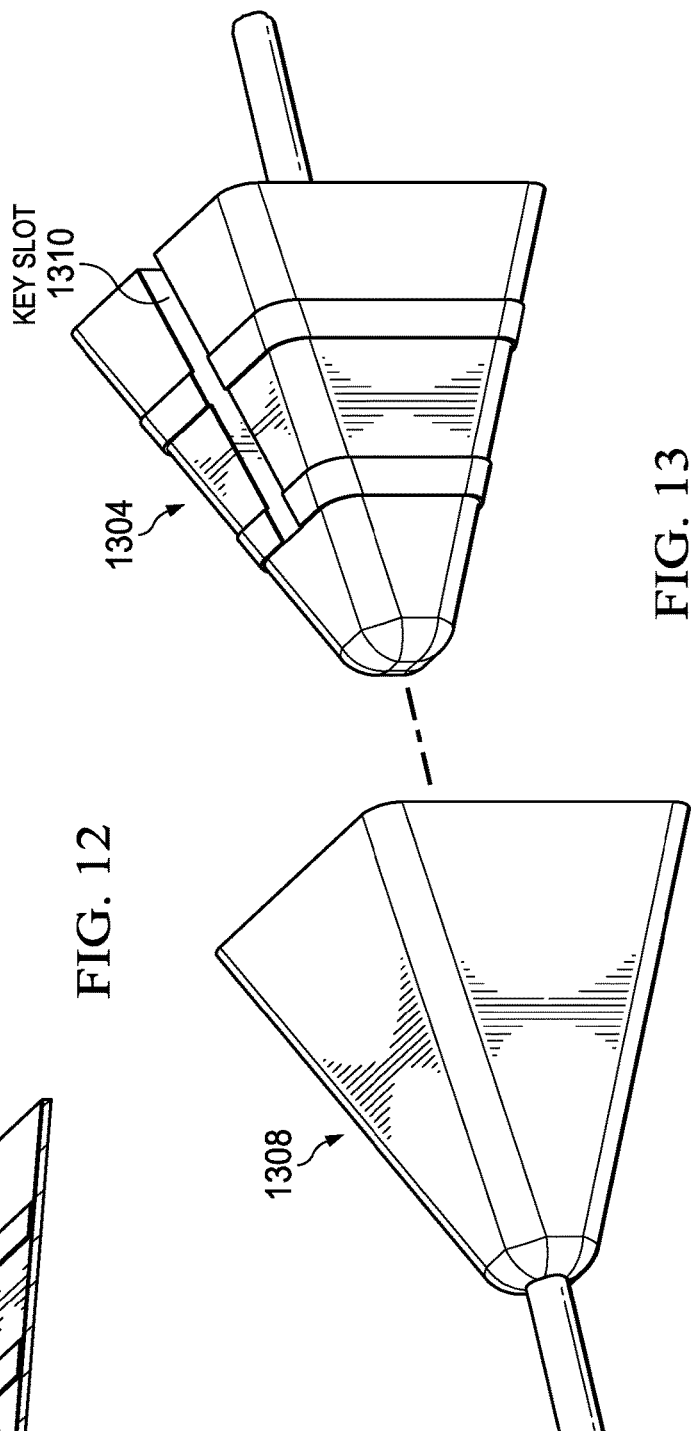
FIG. 12
FIG. 13

IN-FLIGHT RECHARGING OF AERIAL ELECTRIC VEHICLES

TECHNICAL FIELD

This disclosure relates generally to electric vehicles, and more particularly, though not exclusively, to a system and method for providing in-flight recharging of aerial electric vehicles.

BACKGROUND

Electric vehicles are increasingly popular, because of the perceived environmental benefits. Electric vehicles have zero to low emissions, and if recharged from a "green" power source, are considered to have minimal environmental impact.

SUMMARY

In an example, there is disclosed an electrical tanker aircraft for in-flight recharging a worker aircraft, comprising: a charge source; an umbilical to engage an in-flight charge recipient aircraft; and control logic to determine that the umbilical has engaged the charge recipient aircraft, and to transfer charge until a termination condition is met.

BRIEF DESCRIPTION OF THE DRAWINGS

FIG. 10 is a block diagram illustration of another embodiment of a connector, according to the teachings of the present specification.

FIG. 11 is a cutaway side view of the embodiment of FIG. 10, in which a data terminal is shown at the end of an umbilical, according to the teachings of the present specification.

FIGS. 12 and 13 illustrate a cutaway perspective view and non-cutaway perspective view of yet another embodiment, according to the teachings of the present specification.

DETAILED DESCRIPTION

Figure 1:
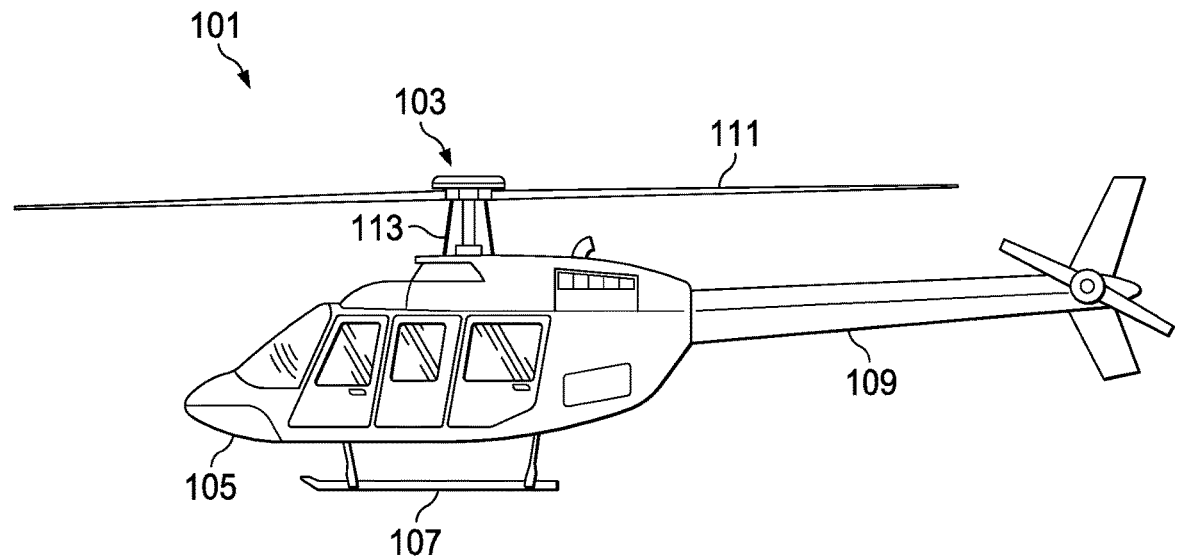
FIGS. 1 and 2 illustrate example aircraft, according to the teachings of the present specification.

With the increasing popularity of electric vehicles, there has been some attention to providing aerial electric vehicles. Aerial electric vehicles are not new, per se. Small model aircraft have been powered electrically for decades. More recently, small drone aircraft have also been powered electrically. However, recently more attention has been paid to providing higher utility drone vehicles, such as delivery drones in an electric platform. Some of these drones may be substantially larger than toy radio controlled (RC) aircraft and hobby drones, such as hobbyist quad copters, that are widely available to consumers. Commercial delivery drones may have a relatively large payload capacity, and may be relatively more complex than hobbyist drones. Furthermore, even manned vehicles, such as fixed-wing and rotary aircraft, can be electrically powered. In the case of a manned electric vehicle, safety considerations dictate that there should be ample warning before the manned aircraft loses charge, so that it can be landed safely when necessary.

Whether rotary or fixed-wing, and whether manned or unmanned, there are cases where the operational needs of an electric aircraft exceed the range of the aircraft on a single charge. Requiring the aircraft to land and charge midflight can be costly in terms of time (and therefore money), can cause delays in executing the mission, and may be otherwise inconvenient or impractical. It is, therefore, advantageous to provide a mechanism for aerial recharging of an electric aircraft midflight. In one example, a first aircraft that is low on charge electrically or electromechanically couples to a second aircraft that has excess charge. This could be a second aircraft in the vicinity, whose expected flight path is not calculated to use the entire available charge, or it could be a dedicated recharging aircraft such as a "tanker drone" conceptually similar to the tanker airplanes that are used for aerial refueling of fighter jets.

In an illustrative example, the first drone (which is low on charge), makes contact with a tanker drone and requests recharge services. In some cases, tanker drones may be placed strategically at waypoints along common flight paths, so that they can be deployed to recharge worker drones whose flight paths extend beyond the capability of a single charge. It should be noted that the designations of "worker drone" and "tanker drone" in this context are provided by way of illustrative example, only. The nature of the two drones need not be fixed. Furthermore, the placement of tanker drones can be considered an exercise of skill in the art. It is expected that between fueling worker drones, the tanker drone may return to a charging station to replenish its own charge. The tanker drone, in some examples, may be of a design similar to the worker drones that it recharges. However, whereas the worker drones may carry payloads (sometimes on the order of up to hundreds of pounds or more), the tanker drone's payload may be a large battery pack that can be used to recharge worker drones. The battery pack may be large enough to fully recharge one or more worker drones without recharging the tanker drone. The tanker drone may also have facilities for charging a plurality of worker drones at one time. For example, the tanker drone may have a boom or cable that can be extended to electrically engage a worker drone. The tanker drone may have multiple such booms or cables, so that multiple worker drones can recharge at one time. In some cases, two or more tanker drones may work in tandem, so that one tanker drone can remain continuously aloft and continuously available to charge worker drones. When the aloft tanker drone has depleted its charge, it may return to the docking station to recharge, and its tandem tanker drone can simultaneously deploy to be available to recharge worker drones.

In an illustrative example, a worker drone that requires recharge establishes communication with a tanker drone and negotiates recharging. This negotiation could include negotiating with the tanker drone the charge required for the worker drone, in comparison to the charge available from the tanker drone. In cases where the tanker drone is provided by a third-party service, the negotiation could also include negotiating a recharging fee for the worker drone to recharge. The tanker drone may ensure that it is in an appropriate position, that it has sufficient available charge to recharge the worker drone, that the payment has been accepted, or any other factors that need to be considered before recharging can engage. Once the negotiation has been completed, the tanker drone and worker drone can maneuver near one another and electrically or electromechanically couple.

In one embodiment, the tanker drone deploys a rigid boom or a flexible cable having on the end, thereof, a polarized charging jack that is configured to engage a charging port on the worker drone. Note that this is only one illustrative example, and just as easily the worker drone could deploy a boom or cable to engage a port on the tanker drone. In other embodiments (particularly in the case where the tanker drone is not a dedicated tanker drone, but is simply a worker drone with available excess charge), both drones could extend booms or cables that can couple midair.

The use of a boom or cable has advantages in that it can provide some separation between the tanker drone and the worker drone. This spatial separation enables both drones to maintain their center of gravity, and reduces the likelihood of airflow interference between the two drones, which could reduce stability. In one example, the tanker drone deploys a long boom or cable with a polarized jack, and the worker drone has in an appropriate location, such as on top of the drone, a port to receive the jack. Once the worker drone has engaged the jack and a successful connection is made, the tanker drone can begin transferring charge to the worker drone. Depending on the context and the needs of a particular embodiment, this recharge could occur while the two drones are hovering, particularly in the case where the drones are rotary drones or other rotary aircraft. This configuration is also especially useful in a case where the tanker drone is a dedicated tanker drone deployed in-air at a strategic waypoint, and provided with multiple umbilicals to simultaneously recharge multiple worker drones. In that case, it may be desirable for the tanker drone to remain in a relatively fixed location and allow worker drones to come along and recharge, as necessary.

In other cases, such as in the case of fixed-wing aircraft that have limited or no hover capability, or in the case where the tanker drone is not a dedicated tanker drone, it may be desirable for the two drones to continue along their flight path while recharging occurs. This is especially useful in a case where both drones have a similar flight path, or at least a leg of flight path that follows a common route.

It should be noted that while "worker drones" and "tanker drones" are discussed in the foregoing paragraphs by way of example, the teachings herein are not limited to drone aircraft. The aircraft described could just as easily be manned or unmanned, fixed-wing or rotary. Furthermore, as discussed above, the designation of a "worker drone" in contrast to a "tanker drone" is made for convenience of the discussion. In broad terms, a worker drone as used throughout this specification and the appended claims can mean any manned or unmanned fixed-wing or rotary electric aircraft requiring recharging services. A tanker drone can include any manned or unmanned fixed-wing or rotary aircraft having available excess charge to impart to the worker drone. Indeed, the tanker drone need not necessarily be an electric aircraft. A jet fueled aircraft that generates electricity via its engines could similarly provide refueling services to an electric aircraft. For example, a military KC-135 aircraft is a purpose-built tanker aircraft for in-air refueling of jet fueled aircraft. A KC-135 could also be provided with electrical recharging umbilicals that could be used to recharge electric aircraft, such as military drones or manned military electric aircraft. Unless otherwise specified, the term "drone" used in any of the examples below should be understood to stand as an example for the entire class of unmanned aerial vehicles regardless of size. The term "tanker drone" should be understood to stand for an example of the entire class of electrical vehicles that may impart charge to other electrical vehicles. The term "worker drone" should be understood to stand for an example of the entire class of electrical vehicles that may receive charge from a tanker drone.

One consideration herein is the design of the umbilical, itself. As discussed above, the umbilical could be a rigid boom or a flexible cable. To ensure proper recharging, the boom may have a jack, such as a conical jack, that has polarized connections. To ensure proper polarity, the plug could be keyed, for example, so that it can only insert in one direction into the receiving jack. In another embodiment, the plug is unkeyed, but includes radial connector bands that are electrically isolated from one another, similar to a 3.5 mm audio jack with electrically isolated, radial positive and negative terminals. The use of radial bands can help to ensure correct connection, regardless of orientation of the plug into the jack.

To secure the plug into the jack, one or either may be magnetized, either with a permanent magnet or an electromagnet. In the case of an electromagnet, the electromagnet may engage once contact has been made, to secure the plug into the jack. One advantage of an electromagnet is that release may be easier than in the case of a permanent magnet, in which case some motive force may need to be imparted to the plug to disengage it from the jack. In other examples, a permanent magnet could be used, but with an electromagnetic feature that temporarily disengages the magnetism while the plug and the jack release.

A further consideration is the provision of a quick disconnect. A quick disconnect may be required in the case of turbulence, or in the case for example where the tanker drone receives urgent instructions to disengage, to complete a different mission. A quick release could be provided by use of an electromagnet, wherein simply removing an electric field from a coil eliminates the magnetism. When the magnetism is eliminated, the umbilical can be quickly retracted or disengaged, and the two drones can go about their work.

The two drones may also need to communicate with one another. For example, the worker drone (or more broadly, the drone with the jack) may be best positioned to determine whether a successful connection was made. If the connection was not made, or if the connection is poor so that charge transfer is inefficient, the worker drone may need to communicate this to the tanker drone, so that a new connection can be made. The worker drone may also require a processing algorithm to determine when to disengage. If the worker drone attempts to reach absolute 100% battery charge, then the connection could be stuck endlessly waiting, as the worker drone is consuming some battery power while remaining aloft to recharge. Thus, there may be an algorithm that disengages once the worker drone reaches a threshold charge value, such as 99%, for example. In other cases, the initial negotiation could be for a fixed time on charge, or for a fixed quantity of charge transfer.

In cases where the charge is for a fixed time, then the two drones may simply disengage after the fixed time. Similarly, if a fixed charge transfer is to be made, then the two drones may disengage after the fixed charge transfer is complete.

In a case where a more interactive communication is required, such as in a case where charging is to occur up to a given threshold, there may need to be communication between the tanker drone and the worker drone.

In a very straightforward implementation, communication could be via a simple light or beacon, such as an LED that lights up when the worker drone has completed charging. This could be useful in a context where the two drones are not guaranteed to share a common communication protocol. In that case, the tanker drone may simply have a camera that observes the beacon light on the worker drone. Once the beacon light lights up, the tanker drone can disengage from the worker drone.

In other examples, more detailed communication may occur, particularly if the two aircraft share a common communication protocol. This communication could be a wireless out-of-band communication (i.e., out-of-band of the refueling itself), and could include the same protocol used to negotiate the initial recharging transaction. In other cases, the recharging umbilical itself may include communication facilities. This could include dedicated connections for a serial or parallel bus, by which the two drones can communicate. In another example, data transmissions may occur on the same connection lines that are used for recharging. For example, the recharging itself may occur via direct current (DC) charge transfer. When communication is necessary, a time varying or alternating current (AC) signal may be directed down the line. The recharging circuit may include a low pass filter that filters out such signals, while a separate circuit with a high pass filter can be used to capture the communications. In this case, the DC charging input can be rectified, while the AC data input can be unrectified.

The foregoing examples are described in terms of an umbilical, such as a boom or a cable, that is extended to connect one aircraft to another. This configuration is not always practical, particularly in the case where the tanker drone is not a dedicated tanker drone, but rather is simply an aircraft with excess charge capacity. In that case, worker drones may have to be designed with separate facilities to both give and receive charge (e.g., booms, sockets, and jacks). However, a direct electrical connection is not necessary in all cases. In some configurations, inductive coils could be provided so that two drones can simply hover near one another and the worker drone can receive charge from the tanker drone via inductance. Advantageously, this would not require separate circuitry for nondedicated tanker drones. The inductive coil that is used to give charge can also be used to receive charge. In the case of inductive coupling with no physical wires, a tuner circuit or tuning engine using digital logic may be used to identify and lock onto the optimal charge rate frequency.

Advantageously, the teachings of this specification can be scalable and adapted to both large drones and small drones, or in some cases the use of a large drone to recharge a smaller drone.

In various embodiments, the incoming charge could be rectified or unrectified.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIG. 1 illustrates an example embodiment of a rotorcraft 101. Rotary aircraft 101 could be either a manned or an unmanned rotary aircraft. In some cases, rotary aircraft 101 could be electrically powered instead of powered by jet fuel. In those cases, rotary aircraft 101 could either be designed from the start with an in-air recharging system, or it could be modified after production with an aftermarket in-air recharging system.

In cases where rotary aircraft 101 is powered by jet fuel, it could be modified to serve as a tanker for in-air recharging of electrical aircraft such as electrically powered drones. For example, rotary aircraft 101 could include a generator that converts its jet fuel power into electrical power, and that electrical power could be shared with electrical aircraft such as drones.

The illustrated example portrays a side view of rotorcraft 101. Rotorcraft 101 includes a rotor system 103 with a plurality of rotor blades 111. The pitch of each rotor blade 111 can be managed or adjusted in order to selectively control direction, thrust, and lift of rotorcraft 101. Rotorcraft 101 further includes a fuselage 105 and a tail structure 109. In the illustrated embodiment, tail structure 109 may be used as a horizontal stabilizer. Torque is supplied to rotor system 103 using at least one engine.

In this illustration, rotor blades 111 form a motive subsystem, or in other words, a subsystem that provides the motive force to move the aircraft. The controls that manage or adjust the control direction form a control subsystem, which can include manual user controls, as well as computer augmentation to manual user control. Furthermore, in some embodiments, rotorcraft 101 may be an autonomous drone vehicle, or a remote-controlled drone vehicle, in which case some control functions are provided by a computer.

Figure 2:
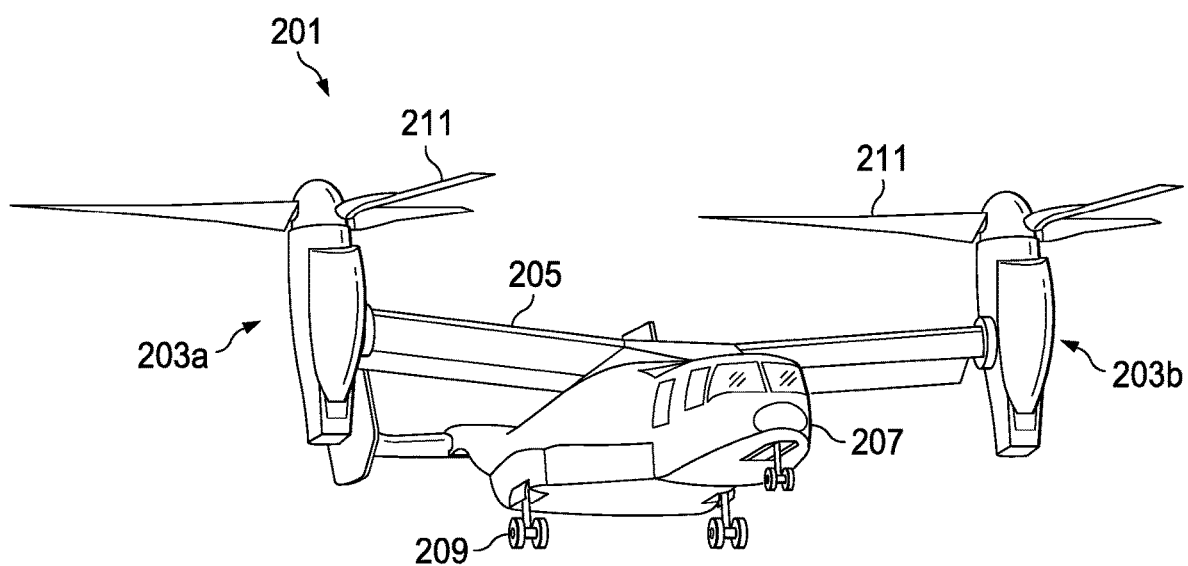

FIG. 2 illustrates a perspective view of an example tiltrotor aircraft 201. Tiltrotor aircraft 201 could be either a manned or an unmanned rotary aircraft. In some cases, tiltrotor aircraft 201 could be electrically powered instead of powered by jet fuel. In those cases, tiltrotor aircraft 201 could either be designed from the start with an in-air recharging system, or it could be modified after production with an aftermarket in-air recharging system.

In cases where tiltrotor aircraft 201 is powered by jet fuel, it could be modified to serve as a tanker for in-air recharging of electrical aircraft such as electrically powered drones. For example, tiltrotor aircraft 201 could include a generator that converts its jet fuel power into electrical power, and that electrical power could be shared with electrical aircraft such as drones.

Tiltrotor aircraft 201 includes nacelles 203a and 203b, a wing 205, and a fuselage 207. Each nacelle 203a and 203b respectively includes a plurality of rotor blades 211. Moreover, each nacelle 203a and 203b may include an engine and gearbox for driving rotor blades 211. In some embodiments, nacelles 203a and 203b may each be configured to rotate between a helicopter mode, in which the nacelles 203a and 203b are approximately vertical, and an airplane mode, in which the nacelles 203a and 203b are approximately horizontal.

It should be appreciated that rotorcraft 101 of FIG. 1 and tiltrotor aircraft 201 of FIG. 2 are merely illustrative of a variety of aircraft that can be used to implement embodiments of the present disclosure. Other aircraft implementations can include, for example, fixed-wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

In this illustration, rotor blades 211 form a motive subsystem, or in other words, a subsystem that provides the motive force to move the aircraft. The controls that manage or adjust the control direction form a control subsystem, which can include manual user controls, as well as computer augmentation to manual user control. Furthermore, in some embodiments, tiltrotor aircraft 201 may be an autonomous drone vehicle, or a remote-controlled drone vehicle, in which case some control functions are provided by a computer.

Figure 3A:
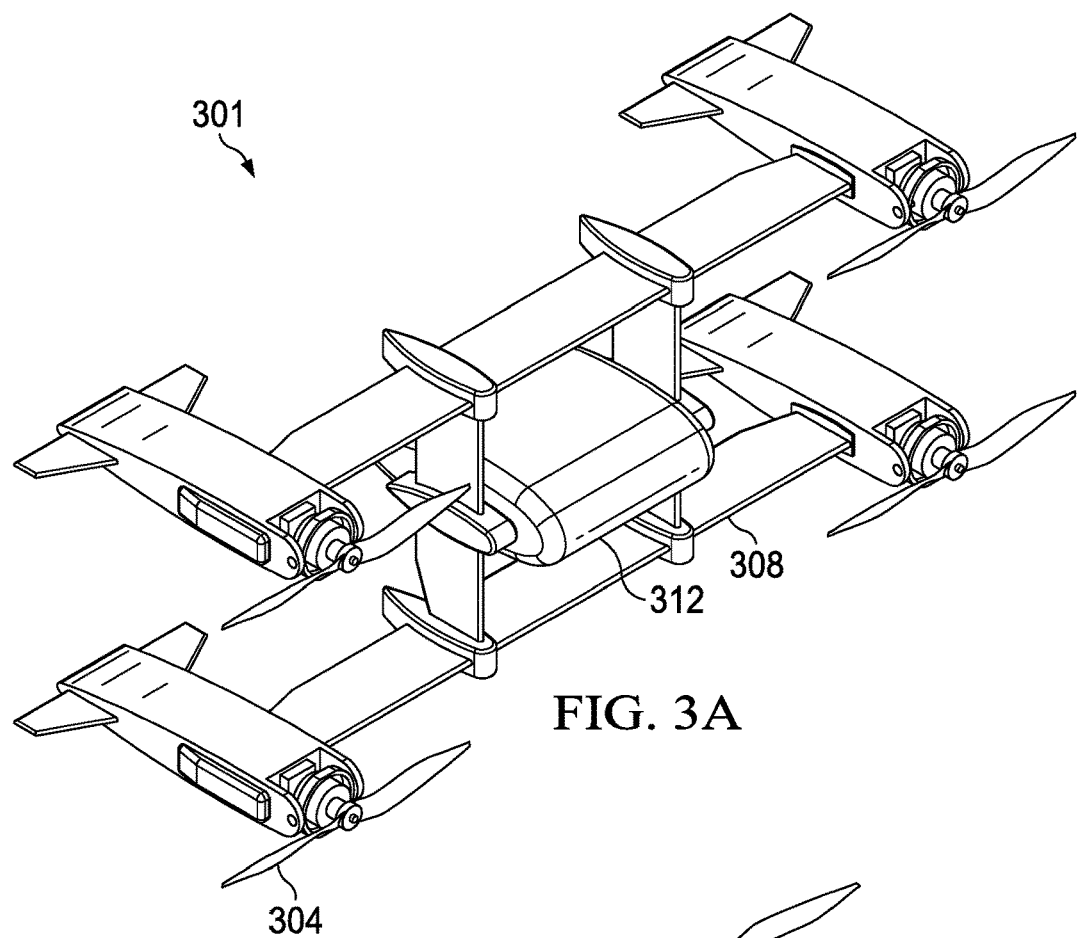
FIGS. 3A and 3B are an illustration of a drone, according to the teachings of the present specification.
Figure 3B:
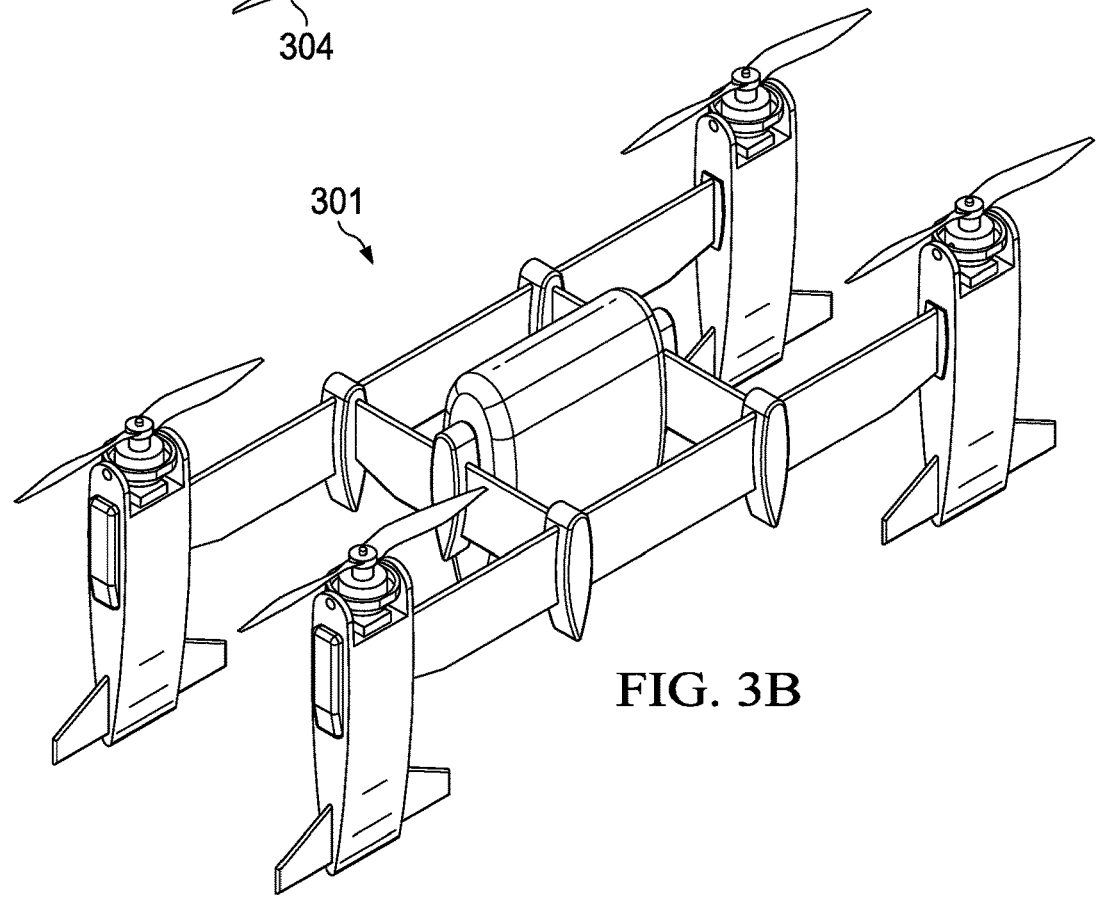

FIGS. 3A and 3B are an illustration of a drone 301, which in common usage is an electrically powered vehicle. Drone 301 could either be designed from the start with an in-air recharging system, or it could be modified after production with an aftermarket in-air recharging system. In this case, drone 301 includes an airframe 308 that provides mechanical structure for drone 301. Drone 301 also includes rotors 304, which provide the motive force for drone 301. A control system 312 is provided, which includes electronics, logic, a fuel package (such as a battery), and other material that may be used to control the flight of drone 301. For example, Bell Helicopter provides the Bell Autonomous Pod Transport (APT) drone, which is a highly capable multicopter that can be used for various applications, including delivery of packages and materials. Illustrative Bell APT drones have payload capacities in the range of tens to hundreds of pounds. For example, the APT-20 has a maximum payload of 20 pounds, while the APT-300 has a maximum payload of 300 pounds.

Figure 4:
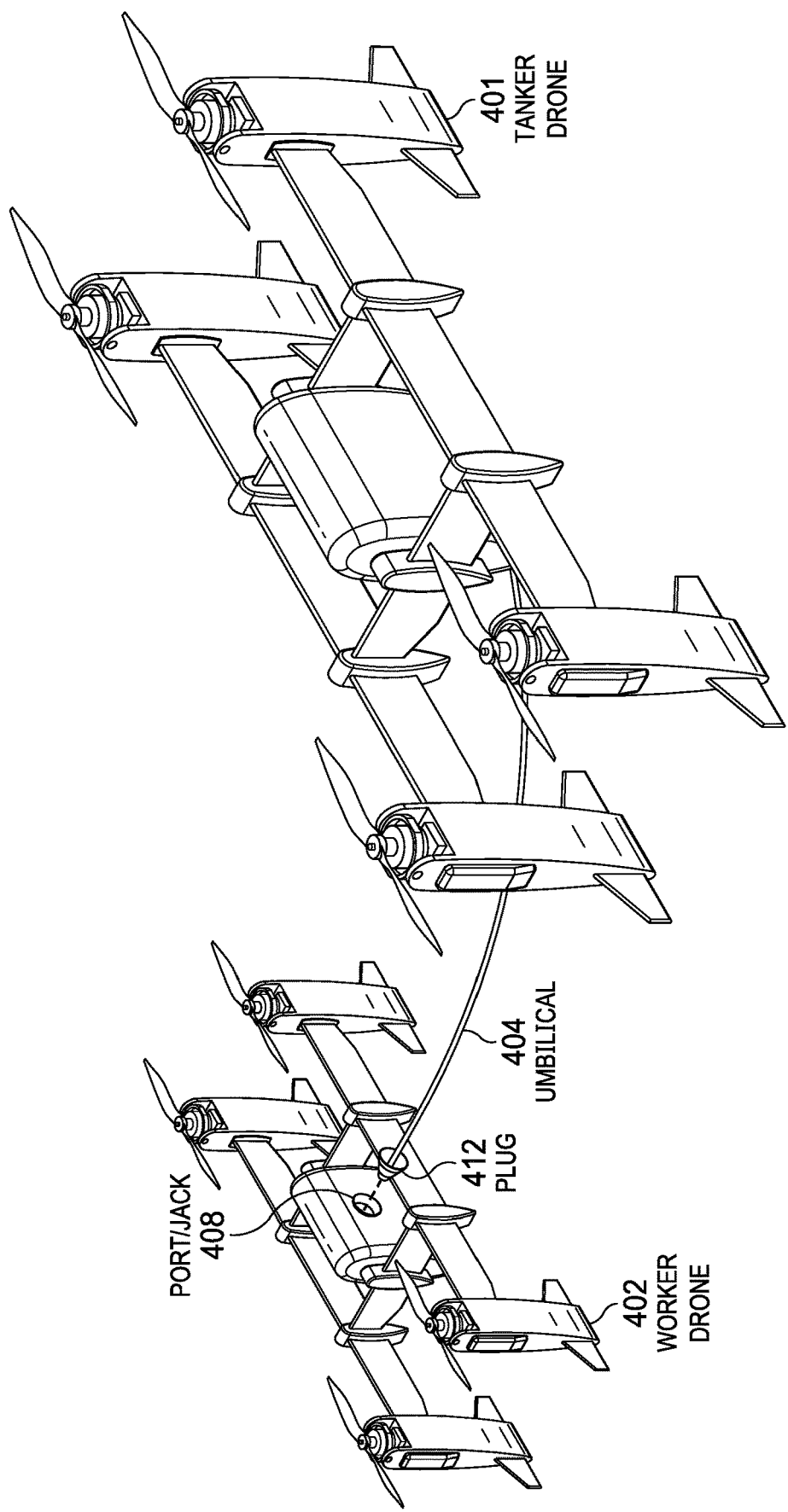
FIG. 4 is a perspective view illustration of a plurality of drones engaging in in-air recharging, according to the teachings of the present specification.

FIG. 4 is a perspective view illustration of a plurality of drones engaging in in-air recharging. In this case, a first drone 401 is designated as a tanker drone, while a second drone 402 is designated as a worker drone. It should be noted that the designation of a tanker drone 401 and worker drone 404 is for convenience of the discussion only. Tanker drone 401 need not be a dedicated tanker drone, and worker drone 402 need not be a dedicated worker drone. Rather, the designation here illustrates different roles that these drones may fill at a particular time. It should also be noted that the aircraft need not be drones, and need not be rotary aircraft. For the configuration to work, one of the drones should have excess charge available to impart to the other drone, the aircraft receiving the charge should be an electrical aircraft in need of recharging, and both should be configured for in-air recharging.

In one illustrative example, tanker drone 401 could be a dedicated tanker drone that carries extra batteries as its payload, as discussed above. This may allow tanker drone 401 to stay aloft for extended periods of time, and to be strategically located, possibly at waypoints, where worker drones can recharge.

In this case, tanker drone 401 extends an umbilical 404 that engages a port or jack 408 on worker drone 412. Port or jack 408 receives a terminal plug 412 at the end of umbilical 404.

Umbilical 404 could be a rigid boom, a semi-rigid or flexible boom, a flexible cord, or some other configuration. As noted above, the use of an umbilical is also optional. In other embodiments, other electromechanical coupling means could be used, including in some cases the use of inductive coupling that does not require a physical connection between tanker drone 401 and worker drone 402.

FIGS. 5-15 illustrate various embodiments of umbilicals and terminal connectors that could be used to form direct electrical connections in embodiments where such a connection is used. These illustrations are illustrative only, and are not exclusive of other types of connections.

Figure 5:
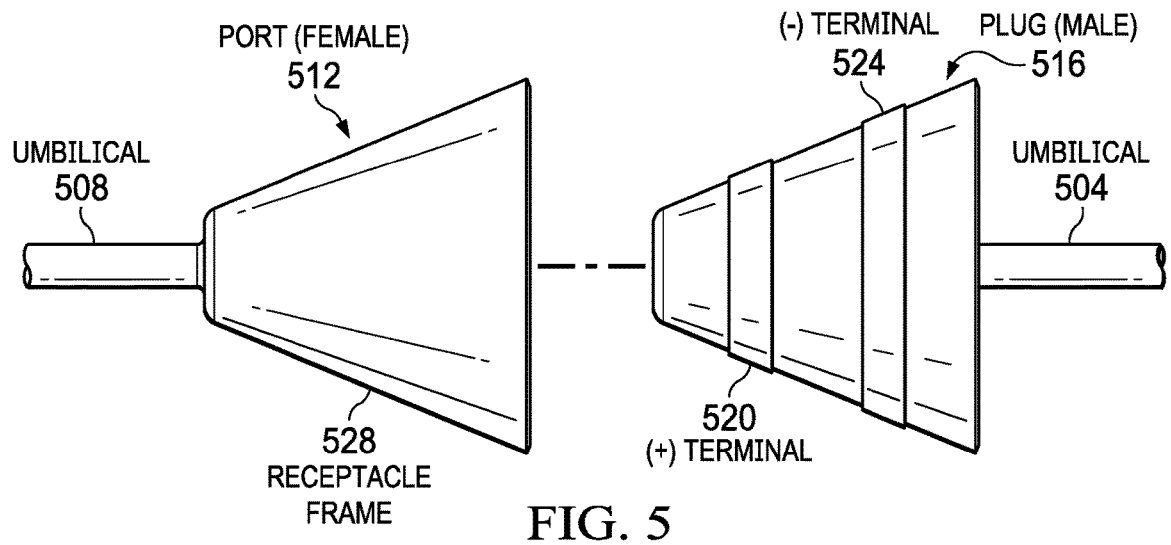
FIG. 5 illustrates a side view of a connection ecosystem, according to the teachings of the present specification.

FIG. 5 illustrates a side view of a connection ecosystem. In this case, a male plug 516 couples to a female port 512. Both male plug 516 and female port 512 have respective umbilicals 504 and 508. Umbilicals 504 and 508 may include cables to carry one or more signals. For example, umbilicals 504, 508 could carry power only, could have a separate power and data lane, or could carry power and data on a single connection.

In this configuration, male plug 516 includes a positive terminal 520 and a negative terminal 524. In this case, terminals 520, 524 are shown as concentric rings around the structure of male plug 516. Not visible in this FIGURE are mating connectors in female port 512. Positive terminal 520 may be electrically isolated from negative terminal 524 by a dielectric material in the body of male plug 516.

Figure 6:
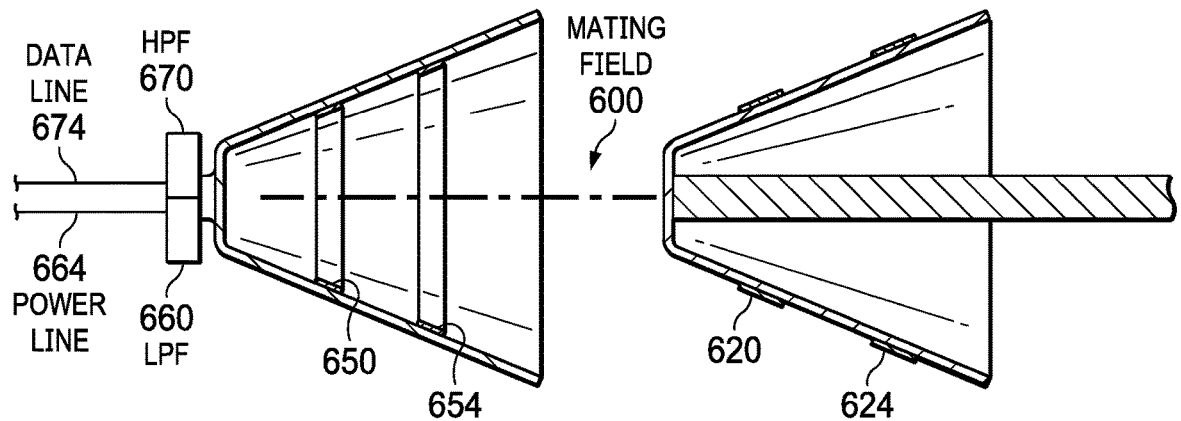
FIG. 6 illustrates a cutaway side view of selected elements of a connection ecosystem, according to the teachings of the present specification.

FIG. 6 illustrates a cutaway side view of selected elements of a connection ecosystem. Visible here are terminals 620 and 624, which may correspond to terminals 520 and 524 of FIG. 5. Also visible in this FIGURE are terminals 650 and 654, which can be seen in the cutaway view of the female port. In this configuration, terminal 650 may mate to terminal 620, and terminal 654 may mate to terminal 624.

Also in this FIGURE, a mating field 600 may develop between the male and female sides of the connection. Mating field 600 could be, for example, a magnetic or electromagnetic field that draws the two connectors together and encourages contact between them. This attractive field helps to ensure both that the male plug docks with the female port, and to ensure that there is good contact between terminals 650 and 620, and 654 and 624, respectively.

Also illustrated in FIG. 6 is an embodiment where the receiving end has a separate data line or data lane 674, and a power line or power lane 664.

In this example, the tanker drone may provide both data and power on a single line. A low pass filter 660 is used to filter out data signals from the single conductor, so that power is provided on power lane 664. High pass filter 670 is used to filter out the DC power and ensure that only data signals are provided to data lane 674.

Figure 7:
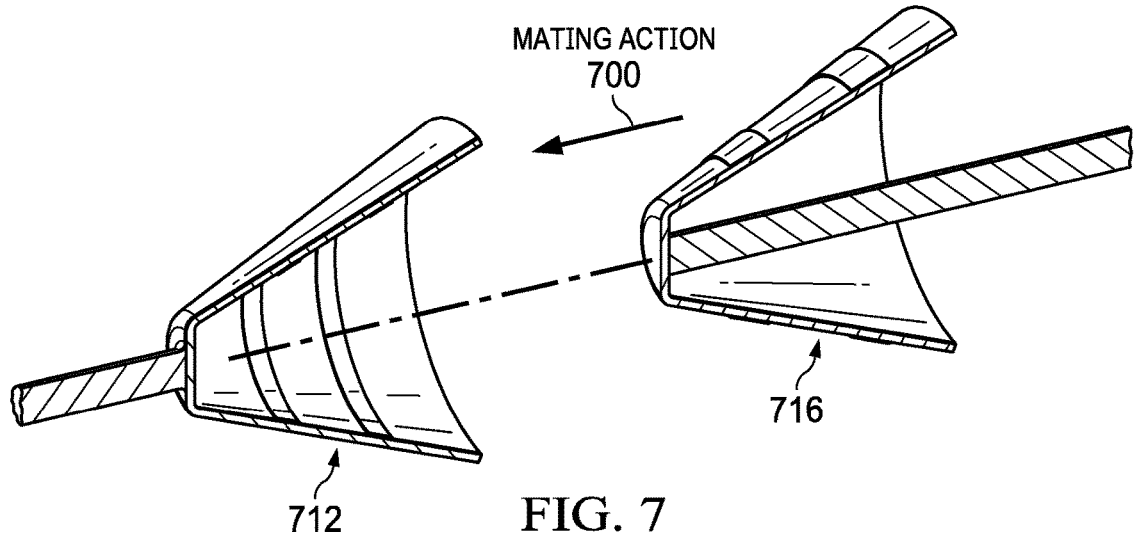
FIG. 7 is a cutaway perspective view illustrating a mating action in connection with the docking of a male plug with a female port, according to the teachings of the present specification.

FIG. 7 is a cutaway perspective view illustrating a mating action 700 in connection with the docking of a male plug 716 with a female port 712.

Figure 8:
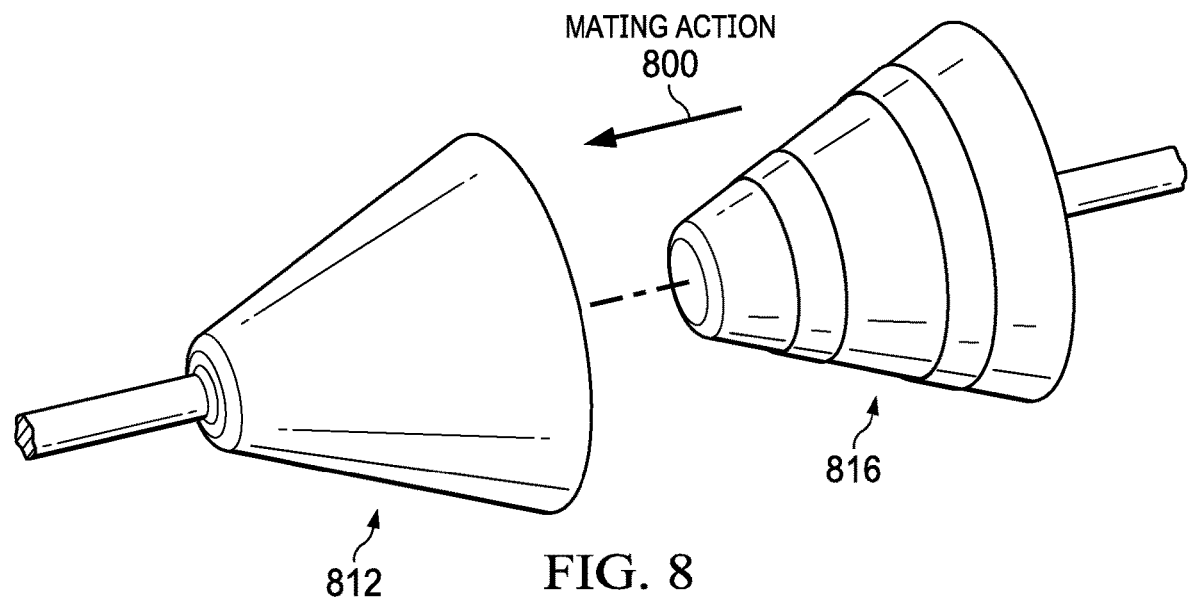
FIG. 8 is a non-cutaway perspective view illustrating the docking of a male plug with a female port, according to the teachings of the present specification.

FIG. 8 is a non-cutaway perspective view illustrating the docking of a male plug 816 with a female port 812. In this illustration, the concentric ring connectors of male plug 816 are visible, while the ring connectors of female port 812 are not visible.

Figure 9:
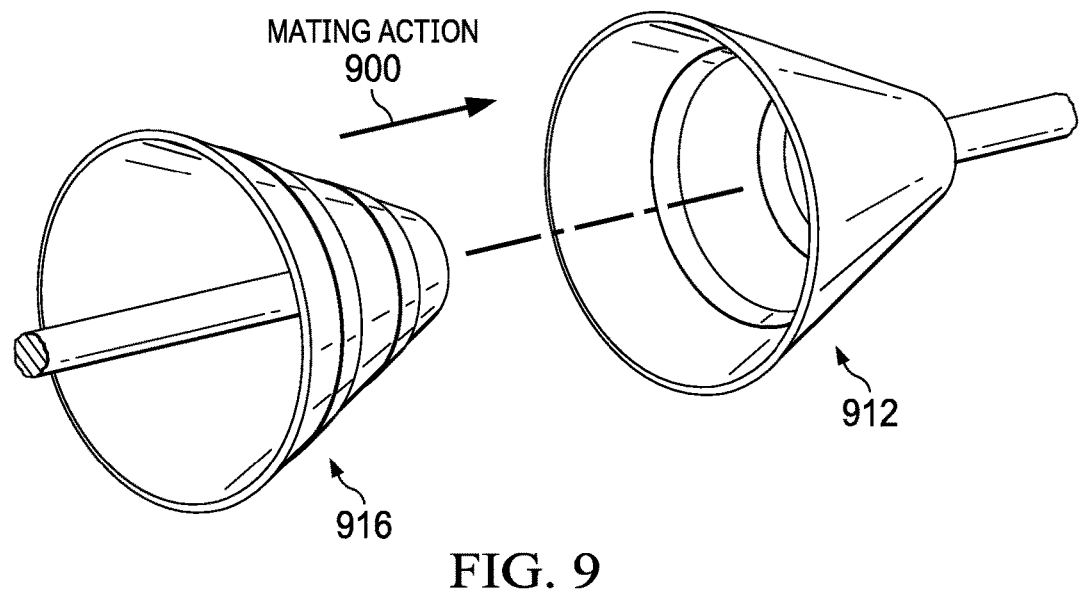
FIG. 9 illustrates the mating of a male plug with a female port, according to the teachings of the present specification.

FIG. 9 illustrates the mating of a male plug 916 with a female port 912. In this case, because of the difference in perspective, the concentric connectors on both the male plug 916 and the female port 912 are visible. As described above, it is intended that good contact is made between the respective concentric connectors.

FIG. 10 is a block diagram illustration of another embodiment of a connector. In this case, male plug 1016 mates to female port 1012. However, in contrast to the embodiment of FIG. 6, male plug 1016 includes a separate data terminal 1030. In this example, positive terminal 1024 and negative terminal 1020 are provided, similar to the foregoing embodiments. However, data terminal 1030 is a separate terminal that carries a dedicated data lane. In this illustration, negative terminal 1020 may be a common or ground terminal that serves for both the charging function and for data transmission. In some cases, it is desirable to have a separate ground for data, in which case a ground terminal may be provided with reference to data terminal 1030. In this embodiment, there is no need for low pass and high pass filters to isolate data from power, because they are provided on separate lanes.

FIG. 11 is a cutaway side view of the embodiment of FIG. 10, in which data terminal 1130 is shown at the end of an umbilical.

FIGS. 12 and 13 illustrate a cutaway perspective view and non-cutaway perspective view of yet another embodiment. In this embodiment, the umbilical is keyed, including a key slot 1210 on male plug 1204, and a key 1214 on female port 1208. In some cases, the orientation of the plug with respect to the port must be correct to get a good connection with the appropriate polarity. In those cases, key slot 1210 and key 1214 may be provided to ensure that the correct mating occurs. In cases where male plug 1204 is at the end, for example, of a long flexible cable, key 1214 and key slot 1210 may be magnetized. If male plug 1204 approaches at the incorrect angle, the magnetic attraction between key 1214 and key slot 1210 will induce a magnetic torque on male plug 1204, and correctly align male plug 1204 to female port 1208.

FIG. 13 illustrates a non-cutaway perspective view of the same embodiment, in which key slot 1310 is visible on male plug 1304. In this perspective, a key is not visible on female plug 1308.

Figure 14:
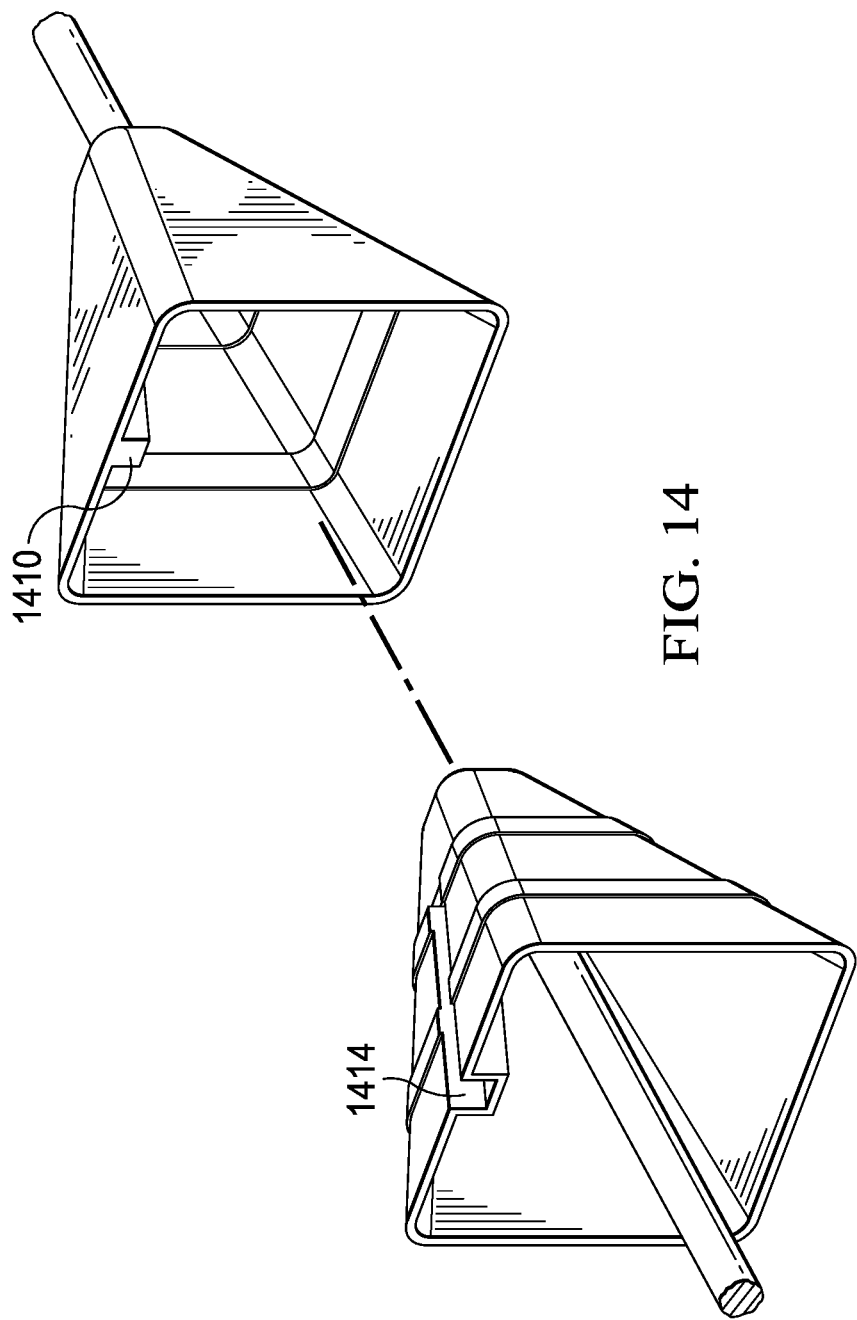
FIG. 14 illustrates a different perspective of the embodiment illustrated in FIGS. 12 and 13, according to the teachings of the present specification.

FIG. 14 illustrates a different perspective of the embodiment illustrated in FIGS. 12 and 13. In this case, key 1410 is visible on the female port, while key slot 1414 is visible on the male plug.

Figure 15:
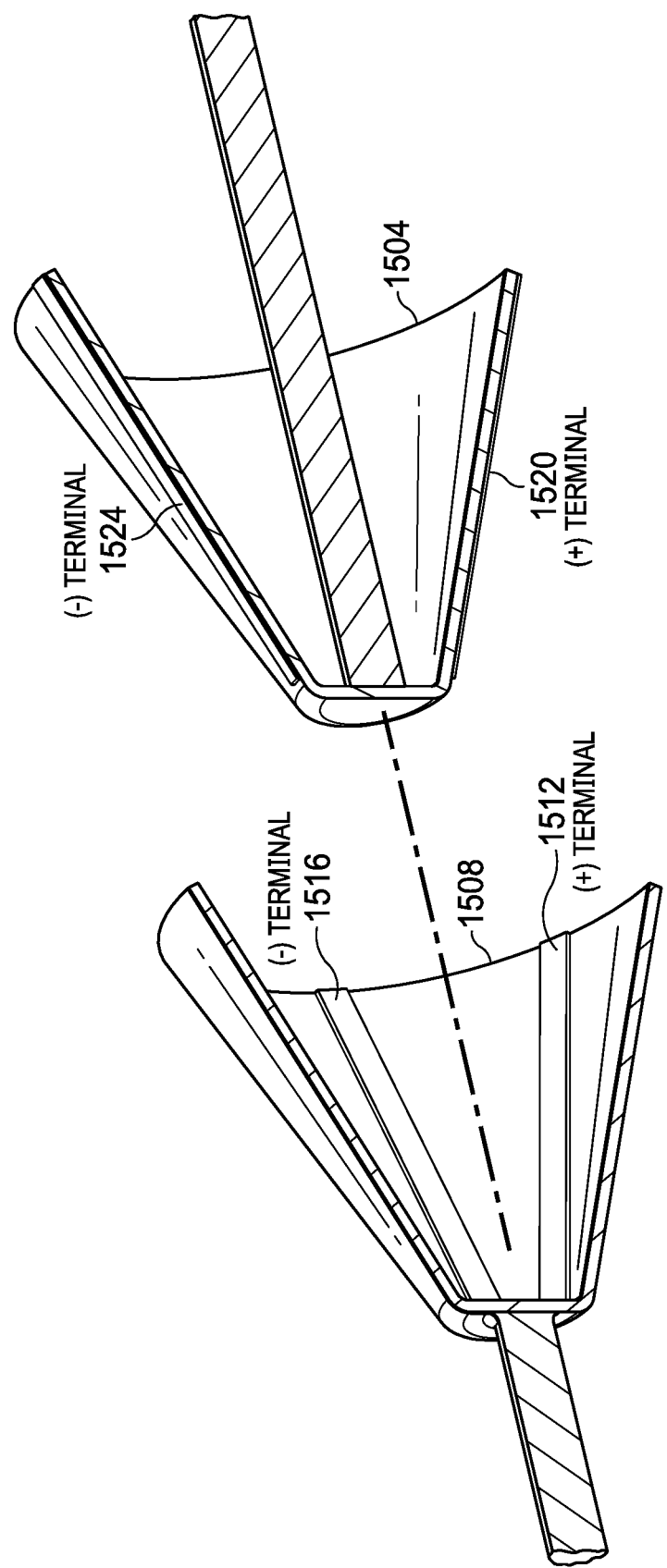
FIG. 15 illustrates yet another embodiment and option for the plugs, according to the teachings of the present specification.

FIG. 15 illustrates yet another embodiment and option for the plugs. In this case, male plug 1504 mates to female port 1508. Male plug 1504 includes negative terminal 1524 and positive terminal 1520. These are to mate to negative terminal 1516 and positive terminal 1512, respectively, of female port 1508. In this embodiment, rather than being concentric rings, the terminals linearly traverse the length of the bodies of the port and the plug.

In this embodiment, orientation is particularly of importance. It may be desirable to ensure that positive terminal 1520 does not mate to negative terminal 1516, and that negative terminal 1524 does not mate to positive terminal 1512. This can be accomplished, in some cases, by providing keying as illustrated in FIGS. 12, 13, and 14. In other embodiments, this can be accomplished via circuitry, in which case it does not matter which terminal physically mates to the other terminal. As long as there is a sufficient electrical potential difference between the two terminals, circuitry can be used to provide the right polarity to the mating.

Figure 16:
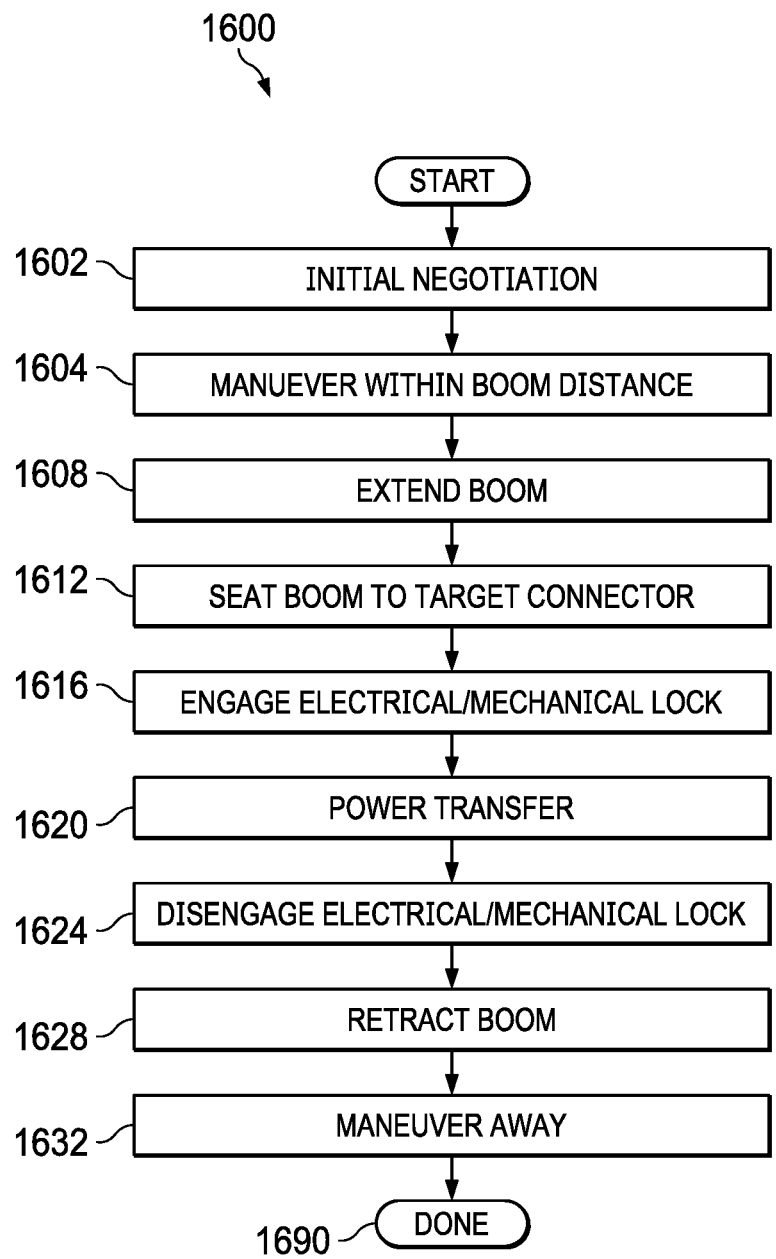
FIG. 16 illustrates a method of in-air recharging, according to the teachings of the present specification.

FIG. 16 illustrates a method 1600 of in-air recharging. In block 1602, the charging client negotiates with the charging supplier. This negotiation could include, for example, identifying a charging supplier (such as an electrical tanker drone), or a jet fueled aircraft with recharging capabilities. The negotiation could also include identifying a rendezvous point for the two craft, negotiating the parameters of the charging, such as charging to a certain percentage, charging for a specified or fixed time, or charging for a specified, fixed, or maximum transfer of charge. The initial negotiation could also include negotiating remuneration if there is a financial transaction involved, such as if the tanker drone is provided as a third-party service.

In block 1604, the charging recipient (e.g., worker drone) maneuvers within boom distance of the charging provider or supplier (e.g., the tanker drone).

In block 1608, the tanker drone extends the boom, or otherwise engages the charging recipient. Note that in some cases, a boom is not necessary. For example, in some embodiments, inductive charging may be used, in which case the two drones merely maneuver close to one another. In some cases, the charging recipient drone could even physically, mechanically, or magnetically dock to the tanker drone, and then disengage its motive subsystem. This can help reduce turbulence and ensure that in the electromagnetic recharging scenario, the drones do not interfere with one another's flight patterns.

In block 1612, in the case that a boom is used, the tanker drone seats the boom to the target connector. This may include operating a logic circuit to ensure that a correct connection is made. This could also include an automated reconnect process if an incorrect connection is made. For example, if the connection is oriented incorrectly, or there is not a good connection, the logic could automatically disengage the connection and attempt to reengage to make a better connection.

In block 1616, the tanker and/or the worker drone engage in electrical and/or mechanical lock. For example, an electromagnet could be engaged to magnetically couple, or a permanent magnet could be provided that provides an automatic coupling. In other examples, a solenoid or other electromechanical device could be used to deploy a catch or a hook that mechanically engages the connection to ensure a secure connection.

In block 1620, the power transfer occurs. The power transfer may occur for a fixed or a maximum time, for a fixed or a maximum charge transfer, or until the client drone reaches a designated threshold percentage charge, all by way of nonlimiting example. The power transfer ends when a termination stimulus is received, such as any of the foregoing described events. In cases where communication is required between the two drones, communication could be provided via a data lane, via data transmission on the power connection, or via some other means, such as a simple beacon or light on the client drone that signals to the tanker drone that the client drone has finished charging.

In block 1624, the drone or drones disengage the electrical or mechanical locks.

In block 1628, in cases where a boom is used, the tanker drone can retract the boom.

In block 1632, the drones maneuver away from each other and continue on their designated flight course.

In block 1690, the method is done.

Figure 17:
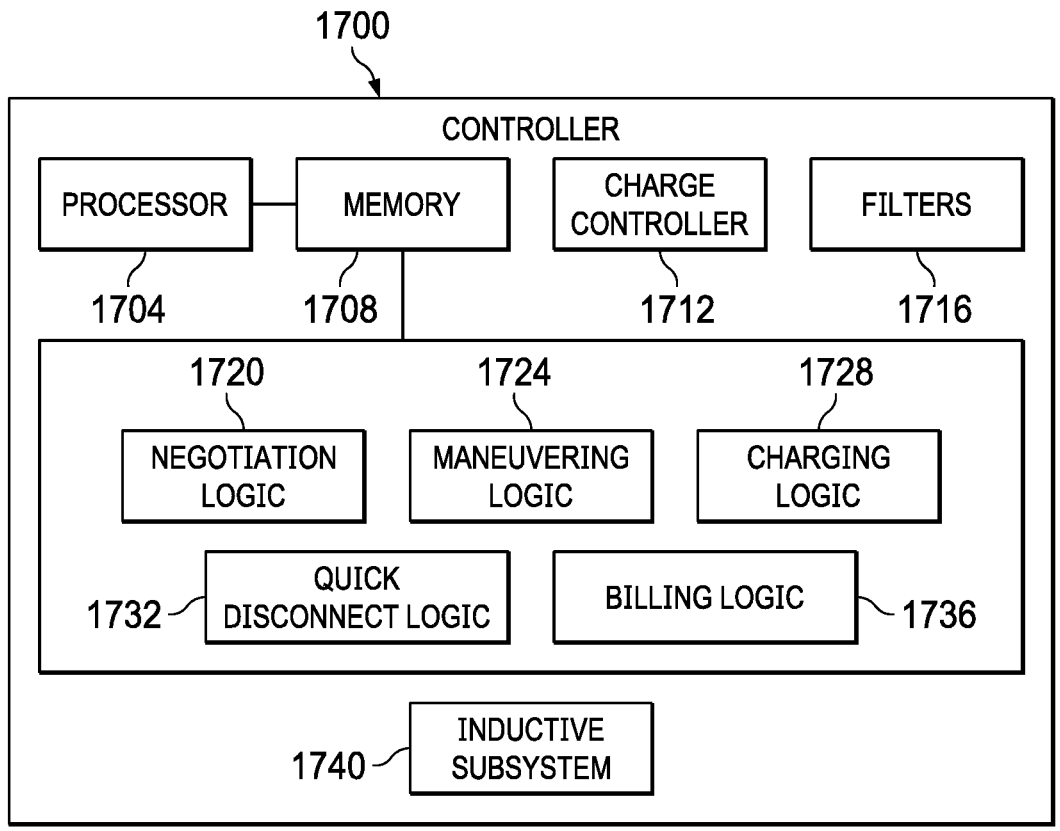
FIG. 17 is a block diagram of a controller that may be used to control a recharging process, according to the teachings of the present specification.

FIG. 17 is a block diagram of a controller 1700 that may be used to control a recharging process. Controller 1700 may be adapted for use either in a tanker or supplier drone, or in a recipient or worker drone, as the case may be.

In this illustration, controller 1700 includes a processor 1704 and a memory 1708. The hardware platform shown here is an example of a platform that may be used to implement embodiments of the teachings of this specification. For example, instructions could be stored in a storage. Instructions could also be transmitted to the hardware platform in an ethereal form, such as via a network interface, or retrieved from another source via any suitable interconnect. Once received (from any source), the instructions may be loaded into memory 1708, and may then be executed by one or more processor 1704 to provide elements such as an operating system, operational agents, or data.

The hardware platform may include several processors 1704. For simplicity and clarity, only one processor is shown. Additional processors (such as 2, 4, 8, 16, 24, 32, 64, or 128 processors) may be provided as necessary, while in other embodiments, only one processor may be provided.

Processors 1704 may be any type of processor and may communicatively couple to a chipset via, for example, point to point (PtP) interfaces.

A memory 1704 is shown, connected to processor 1704. As an example, processor 1704 is shown connected to memory 1708 in a direct memory access (DMA) configuration, though other memory architectures are possible, including ones in which memory 1708 communicates with processor 1704 via a bus. For example, some memories may be connected via a system bus.

Memory 1708 may include any form of volatile or nonvolatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1708 may be used for short, medium, and/or long-term storage. Memory 1708 may store any suitable data or information utilized by platform logic. In some embodiments, memory 1708 may also comprise storage for instructions that may be executed by the cores of processors 1704 or other processing elements to provide functionality.

In certain embodiments, memory 1708 may comprise a relatively low-latency volatile main memory, while storage may comprise a relatively higher-latency nonvolatile memory. However, memory 1708 and storage need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 1708 and storage, for example, in a single physical memory device, and in other cases, memory 1708 and/or storage are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Controller 1700 also includes a charge controller 1712, which is used to control the charging function, either in or out; filters 1716 (e.g., high pass filters and/or low pass filters to segregate data from power); and, as appropriate, an inductive subsystem 1740, which may be used for inductive coupling.

In this example, within memory 1708, there may be numerous engines or logic blocks that may be used to provide various functions.

Negotiation logic 1720 may be used to handle the negotiation functions, such as identifying an appropriate charging supplier or recipient, negotiating the terms of the charging, and otherwise setting up the recharging transaction.

Maneuvering logic 1724 may be part of the overall control system, and may include controls to maneuver the aircraft. Maneuvering logic 1724 may also include logic to maneuver the two drones within charging distance of one another, depending on the context, either within boom distance or within range for inductive charging.

Charging logic 1728 handles the charging transaction, such as ensuring that charge flows from the supplier to the recipient.

Quick disconnect logic 1732 may be provided for a quick disconnect in case of a need for quick disconnect. Quick disconnect conditions can include, by way of illustrative and nonlimiting example, turbulence, electrical short, irregular conditions, adverse weather, or the receipt of urgent instructions to proceed to a new location. The quick disconnect logic 1732 may take a quick disconnect action, such as disengaging a catch or a hook, disengaging an electromagnet, or taking some other action.

Billing logic 1736 may be provided in cases where billing is a concern, such as in cases where the tanker drone and the worker drone are third parties, with respect one another. In those cases, it may be desirable to negotiate remuneration for the charging transaction.

Figure 18:
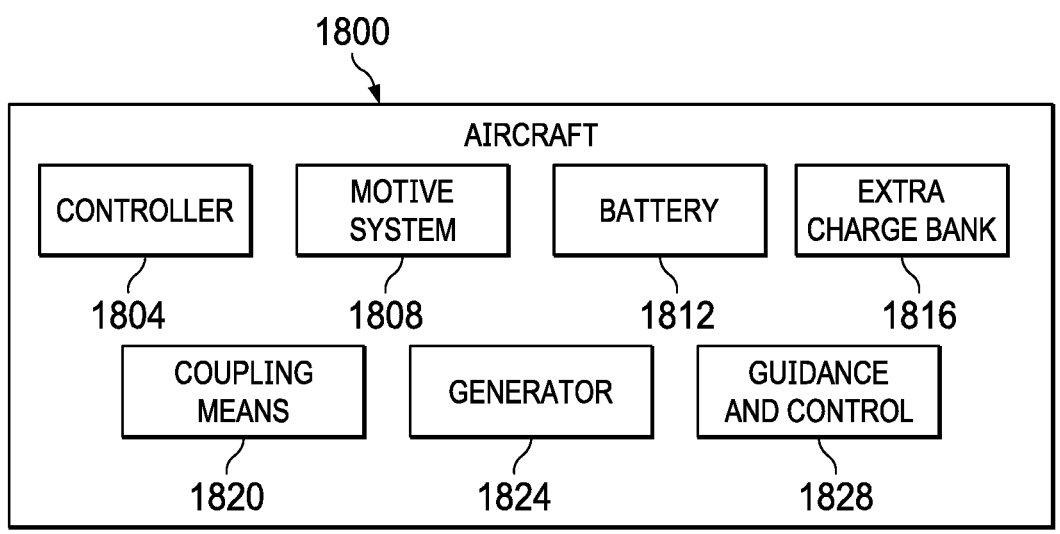
FIG. 18 is a block diagram of an aircraft, according to the teachings of the present specification.

FIG. 18 is a block diagram of an aircraft 1800. This block diagram illustrates only selected components of aircraft 1800, and is simplified for purposes of clarity.

In this illustration, aircraft 1800 includes a controller 1804, which in some cases may be an embodiment of controller 1700 of FIG. 17.

A motive subsystem 1808 provides the motive force for moving the aircraft. This could include rotors, engines, or other apparatus.

Coupling means 1820 provides means for coupling aircraft 1800 to a different aircraft. This can include a boom with a connector, a port to receive a connector, a dock to dock one aircraft to another for inductive or mechanical coupling, or some other coupling means.

Battery 1812 includes the operational battery for aircraft 1800, in cases where aircraft 1800 is battery-powered.

If aircraft 1800 is a dedicated tanker drone, it may optionally include an extra charge bank 1816. Extra charge bank 1816 may, in fact, be the payload of aircraft 1800 in the case of a dedicated tanker drone.

If aircraft 1800 is jet-powered or powered by some other fuel source, a generator 1824 may be provided to supply electricity that can be shared with client aircraft as appropriate.

Guidance and control 1828 provide the general guidance and control functions for aircraft 1800. This includes guidance and control functions that may be used for docking, undocking, and for other configurations of maneuvers in which in-flight recharging may occur.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Embodiments of the teachings of the present specification may include the following nonlimiting examples, substantially as described.

There is disclosed in one example an electrical tanker aircraft for in-flight recharging a worker aircraft, comprising: a charge source; an umbilical to engage an in-flight charge recipient aircraft; and control logic to determine that the umbilical has engaged the charge recipient aircraft, and to transfer charge until a termination condition is met.

There is further disclosed an example electrical tanker aircraft, wherein the tanker aircraft is a dedicated tanker drone.

There is further disclosed an example electrical tanker aircraft, wherein the dedicated tanker drone has a payload comprising an excess battery bank.

There is further disclosed an example electrical tanker aircraft, wherein the dedicated tanker drone has a plurality of umbilicals to simultaneously charge a plurality of worker aircraft.

There is further disclosed an example electrical tanker aircraft, wherein the tanker aircraft is configured to share charge from its own battery or battery bank, and wherein the tanker aircraft is a fueled aircraft and the charge source comprises a generator.

There is further disclosed an example electrical tanker aircraft, wherein the umbilical is a rigid or semi-rigid boom.

There is further disclosed an example electrical tanker aircraft, wherein the umbilical is a flexible cord.

There is further disclosed an example electrical tanker aircraft, wherein the umbilical comprises a separate data lane.

There is further disclosed an example electrical tanker aircraft, wherein the umbilical comprises a terminal plug.

There is further disclosed an example electrical tanker aircraft, wherein the terminal plug is keyed.

There is further disclosed an example electrical tanker aircraft, wherein the terminal plug comprises at least two electrically isolated ring conductors.

There is further disclosed an example electrical tanker aircraft, wherein the terminal plug comprises electrically-isolated lengthwise connectors.

There is further disclosed an example electrical tanker aircraft, wherein the terminal plug is permanently magnetic.

There is further disclosed an example electrical tanker aircraft, further comprising electromagnetic decoupling means for the terminal plug.

There is further disclosed an example electrical tanker aircraft, wherein the terminal plug comprises electromagnetic coupling means.

There is further disclosed an example electrical tanker aircraft, further comprising quick disconnect logic.

There is further disclosed an example electrical tanker aircraft, wherein the termination condition comprises observing an external indicator light on the charge recipient aircraft.

There is further disclosed an example electrical tanker aircraft, wherein the termination condition comprises a fixed charge time.

There is further disclosed an example electrical tanker aircraft, wherein the termination condition comprises a fixed transfer of charge.

There is further disclosed an example electrical tanker aircraft, wherein the termination condition comprises a signal from the charge recipient aircraft.

There is also disclosed an example in-flight recharging system for an electrical aircraft, comprising: an externally-accessible electrical or electromagnetic coupling means; a charge controller to control recharging of a battery via the coupling means; negotiation logic to negotiate recharging with a tanker aircraft; maneuvering logic to maneuver the electrical aircraft into a charging position and engage the tanker aircraft; and charging logic to control charging, determine that charging is complete, and disengage from the tanker aircraft.

There is further disclosed an example in-flight recharging system, further comprising billing logic to negotiate billing for the recharging.

There is further disclosed an example in-flight recharging system, wherein the coupling means comprise an electrical port.

There is further disclosed an example in-flight recharging system, wherein the electrical port is keyed.

There is further disclosed an example in-flight recharging system, wherein the electrical port is conical.

There is further disclosed an example in-flight recharging system, wherein the electrical port comprises electrically-isolated concentric terminals.

There is further disclosed an example in-flight recharging system, wherein the electrical port comprises a terminal for a separate data lane.

There is further disclosed an example in-flight recharging system, further comprising a high pass filter to separate communication pulses from DC power.

There is further disclosed an example in-flight recharging system, wherein the coupling means comprise an inductive coupling coil.

There is also disclosed an example method of in-air recharging, comprising: negotiating recharging with an in-air electrical tanker; maneuvering within refueling distance of the electrical tanker; electrically engaging the electrical tanker; and while in flight, drawing charge from the electrical tanker.

There is further disclosed an example method, further comprising hovering while drawing charge.

There is further disclosed an example method, further comprising proceeding along a designated flight path while drawing charge.

There is further disclosed an example method, wherein negotiating recharging comprises negotiating billing.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An electrical tanker aircraft for in-flight recharging a recipient aircraft, comprising:
   an airframe;
   a battery;
   an umbilical to engage an in-flight recipient aircraft comprising separate power lane and data lane wires;

control circuitry comprising:
a processor circuit; and
a memory including software instructions executable by the processor circuit to cause the control circuitry to:
determine an amount of charge needed by the recipient aircraft to complete a programmed flight profile;
engage, in-air, the recipient aircraft;
determine that the umbilical has engaged the recipient aircraft; and
transfer charge via the power lane until determining, via the data lane, that the recipient aircraft has reached or exceeded the determined amount of charge needed to complete the preprogrammed flight profile.

2. The electrical tanker aircraft of claim 1, wherein the tanker aircraft is a dedicated tanker drone.

3. The electrical tanker aircraft of claim 2, wherein the dedicated tanker drone includes a payload comprising an excess battery bank.

4. The electrical tanker aircraft of claim 2, wherein the dedicated tanker drone includes a plurality of umbilicals to simultaneously charge a plurality of worker aircraft.

5. The electrical tanker aircraft of claim 1, wherein the tanker aircraft is configured to share charge from its own battery or battery bank, and wherein the tanker aircraft is a fueled aircraft and further comprises a generator.

6. The electrical tanker aircraft of claim 1, wherein the umbilical is a rigid or semi-rigid boom.

7. The electrical tanker aircraft of claim 1, wherein the umbilical is a flexible cord.

8. The electrical tanker aircraft of claim 1, wherein the umbilical comprises a terminal plug.

9. The electrical tanker aircraft of claim 8, wherein the terminal plug is keyed.

10. The electrical tanker aircraft of claim 8, wherein the terminal plug comprises at least two electrically isolated ring conductors.

11. The electrical tanker aircraft of claim 1, wherein the umbilical comprises a terminal plug that is permanently magnetic.

12. The electrical tanker aircraft of claim 8, wherein the terminal plug comprises electromagnetic coupling means.

13. The electrical tanker aircraft of claim 1, further comprising quick disconnect logic.

14. An in-flight recharging system for an electrical delivery drone, comprising:
an externally-accessible electrical or electromagnetic coupling means, comprising a separate hard-wired power lane and hard-wired data lane;
a charge controller to control recharging of a battery via the power lane;
negotiation logic to determine an amount of charge needed by the delivery drone to complete a programmed flight path, and negotiate recharging with a tanker aircraft;
maneuvering logic to maneuver the delivery drone into an in-flight charging position and engage the tanker aircraft; and
charging logic to control charging, determine, via the data lane, that charging has reached or exceeded the determined amount of charge needed to complete the preprogrammed flight profile, and disengage from the tanker aircraft.

15. The in-flight recharging system of claim 14, further comprising billing logic to negotiate billing for the recharging.

16. The in-flight recharging system of claim 14, wherein the coupling means comprise an electrical port.

17. The in-flight recharging system of claim 14, wherein the coupling means comprise an inductive coupling coil.

18. A method of in-air recharging a delivery drone, comprising:
determining an amount of charge needed by the delivery drone to complete a programmed flight profile;
negotiating recharging with an in-air electrical tanker drone;
maneuvering within refueling distance of the electrical tanker;
electrically engaging the electrical tanker via an umbilical, wherein the umbilical comprises a separate hard-wired power lane and data lane; and
while in flight, drawing charge from the electrical tanker via the power lane until determining, via the data lane, that charging has reached or exceeded the determined amount of charge needed to complete the preprogrammed flight profile.

19. The method of claim 18, further comprising proceeding along a designated flight path while drawing charge.

* * * * *